United States Patent [19]

d'Alayer de Costemore d'Arc

[11] Patent Number: 4,497,049
[45] Date of Patent: Jan. 29, 1985

[54] SYSTEM FOR DETECTING THE OPERATIVE FACE OF A DISC CARRYING DATA ON ONE FACE ONLY

[75] Inventor: Stephane M. d'Alayer de Costemore d'Arc, Ways, Belgium

[73] Assignee: Staar S. A., Brussels, Belgium

[21] Appl. No.: 467,938

[22] Filed: Feb. 18, 1983

[30] Foreign Application Priority Data

Feb. 25, 1982 [BE] Belgium ................. 892274

[51] Int. Cl.³ .............................. G11B 7/00
[52] U.S. Cl. ......................... 369/50; 369/54
[58] Field of Search .......... 369/53, 54, 47, 50; 360/74.5; 235/419, 375

[56] References Cited

U.S. PATENT DOCUMENTS 4,337,532  6/1982  Romeas ................. 369/50

FOREIGN PATENT DOCUMENTS 55-38663  3/1980  Japan ..................... 369/54

Primary Examiner—Robert L. Richardson
Attorney, Agent, or Firm—Leydig, Voit, Osann, Mayer and Holt, Ltd.

[57] ABSTRACT

A detector system for the operative face of a disc carrying data on one face only is applicable to a laser or optical reading means which is located in turntable apparatus whereby the user is warned of the fact that the disc is placed upside-down and that, therefore, the data which it carries cannot be reproduced. A control signal is generated by the detector system, producing a warning or tripping an operation such as the rejection of the disc or the interruption of the insertion movement.

10 Claims, 6 Drawing Figures

SYSTEM FOR DETECTING THE OPERATIVE FACE OF A DISC CARRYING DATA ON ONE FACE ONLY

TECHNICAL FIELD

The present invention relates to turntable apparatus for disc records and, more particularly, to such apparatus for records known as "compact discs" which carry digital data.

BACKGROUND ART

For manufacturing and marketing reasons, compact discs carry digital data on only one of their faces. To permit easy identification of the face of the compact disc carrying the digital data, one system involves a printed label affixed to the opposite face of the disc which is free of such data.

Such means of identification is not altogether satisfactory since it requires a degree of attention by the user, which is not desirable, e.g., in the case of apparatus used in motor cars, and it also involves a danger of being misinterpreted since, generally, in the past, all disc records have carried a label on each recorded face.

DISCLOSURE OF THE INVENTION

The principal object of the present invention is to overcome these disadvantages by providing simple, reliable and low cost means for detecting that a compact disc which is being inserted into a turntable apparatus is upside-down and, therefore, the data carried by the compact disc cannot be read out and thus reproduced.

BRIEF DESCRIPTION OF THE DRAWINGS

Further objects will become apparent from the following description taken in conjunction with the accompanying drawings, in which.

BEST MODE FOR CARRYING OUT THE INVENTION

Figure 1A:
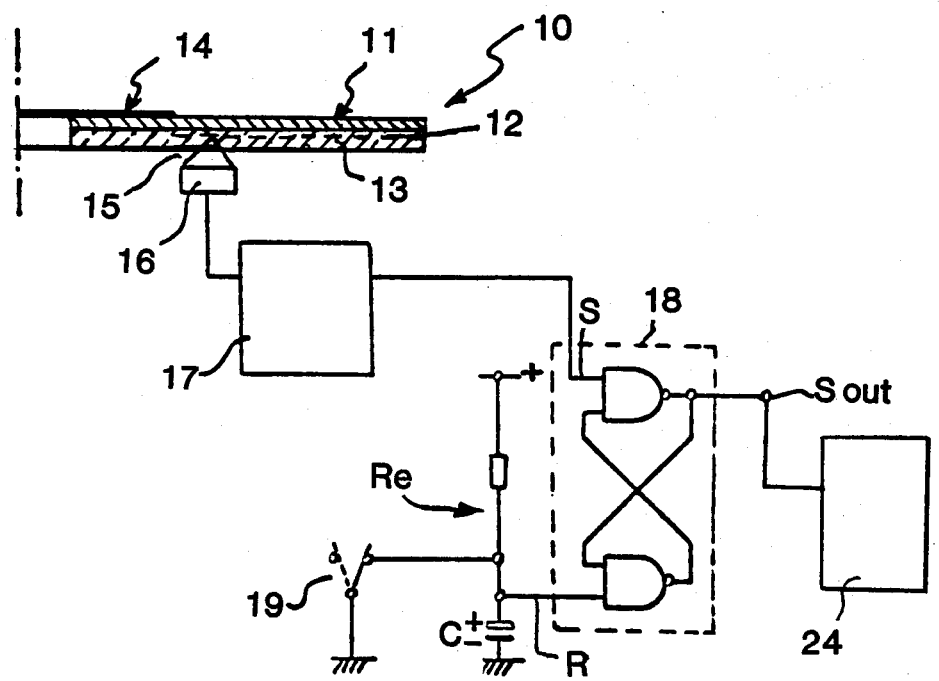
FIG. 1A illustrates a detection system according to this invention associated with an electronic control circuit for the focusing of a laser beam for reading the digital data on the face of a compact disc.

Referring to FIG. 1, a "compact disc" 10 is illustrated in partial section generally comprising a metallic plate 11 having data 12 adjacent one face, said data being recorded on and protected by a layer 13 of a transparent plastic material.

Adhered to the metallic plate 11 on the opposite face to that having the data is a thin layer of plastic bearing an identification label 14.

In turntable apparatus the data 12 carried by the disc 10 are detected by a laser beam 15 which is focused by a lens 16 mounted on a mobile focusing unit controlled by an electronic control 17.

According to this invention, whether a disc is in the turntable apparatus with the operative face positioned for reading by the laser device or with the operative face inverted is detected according to the signal level derived by the laser reading device. For this purpose, the output of the control circuit 17 is supplied to a memory device, herein shown as a bistable multivibrator circuit 18, of the type generally known as a "flip-flop" associated with a delay circuit having a predetermined time constant. In the present case, the delay circuit comprises an RC circuit having a resistance Re and a capacitor C which is connected to switch 19, actuated to the dashed line position by the introduction or the ejection of a disc.

In carrying out the invention, when the disc 10 is introduced in correct position into the turntable apparatus in such a way that the data 12 can be detected by the laser beam 15 (reading through the layer of plastic material 13), the electronic control circuit 17 positions the lens 16 virtually instantaneously and the detection of the recorded data by the laser beam 15 is made possible. This produces a change in the output voltage level representing a data signal from the control circuit 17.

When the unrecorded face of the disc is placed opposite the laser beam 15 (FIG. 1B), the control circuit 17 cannot focus the laser beam for the detection of data and, therefore, cannot deliver a signal of the required level for processing data by the connected processor circuits and produces a no-data signal.

According to this embodiment of the invention, before a disc is introduced the S input to the flip-flop 18 NAND gates is supplied with a positive voltage level. With the R input "zero" since under normal conditions before a disc is inserted the R input is connected to ground through the switch 19, the $S_{out}$ signal is "zero". When the switch 19 is actuated to its dashed line position, the R input changes to a "one" after the voltage level at the R input rises to the "+" voltage, which requires the time interval determined by the time constant of the RC circuit since the R input is connected to the "+" terminal through the resistance Re and to ground through the capacitance C, which is gradually charged during the interval of the time constant. If the S input receives a data signal in the form of a ground signal (a "zero") within the time interval determined by the time constant of the RC circuit (for example, five seconds) from the control circuit 17, the $S_{out}$ signal will shift to a "one" within and remain at "one" after the time interval. If the S input continues to receive a "one" signal (a no-data signal) from the control circuit 17 for the entire predetermined time interval, the change in the R input to a "one" has no effect on $S_{out}$ but the change in the S input from a "one" to a "zero" causes the flip-flop circuit to reverse state and the $S_{out}$ signal to shift from "zero" to "one", reflecting by the state of the memory circuit whether or not the laser beam has been focused within the time interval determined by the time constant of the RC circuit and whether or not the record disc is inverted.

Instead of the flip-flop and delay circuit RC, a circuit may be used which counts the number of focusing attempts of the lens and delivers the control signal after a given number of unsuccessful attempts.

Figure 2A:
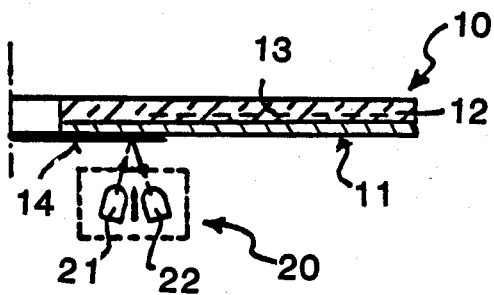
FIGS. 2A-2C and 3 illustrate a detection system according to this invention associated with an opto-electronic reading system for a compact disc.
Figure 2B:
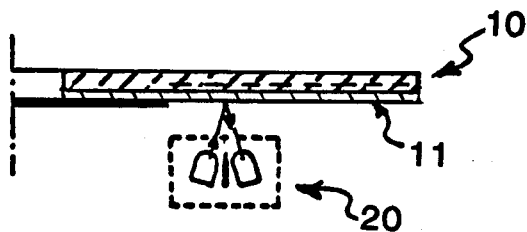
Figure 2C:
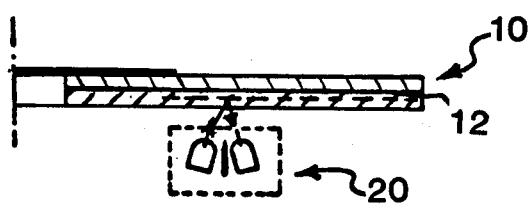

According to an alternative embodiment of the invention applicable to an apparatus in which reading of the digital data is by means of an optical detector 20 located in the disc player apparatus, as shown in FIGS. 2A to 2C, a voltage level output from the optical detector 10 represents that the compact disc is not in correct position.

An optical detector 20 comprises, for example, a light emitting diode 21 and a receiver diode 22.

In the example illustrated, a circuit 18, such as a flip-flop circuit associated with the optical detector, generates a control signal at the output terminal $S_{out}$ when the disc 10 is inverted.

In this case, the optical detector 20 located in the apparatus has its output signal modified when the label (different coefficient of reflection from that of the disc) passes before it (FIG. 2A). At this moment, the state of the flip-flop 18 is reversed and a control signal is generated at the $S_{out}$ terminal.

The output signal of an opto-electronic detector 20 is likewise different according to whether the face read by the said detector carries data 12 (FIG. 2C) or does not carry data 12 (FIG. 2B). A control signal will be generated at the terminal $S_{out}$ by processing this detection signal in the same manner as by processing the change in output signal due to the passing of a label.

Figure 1B:
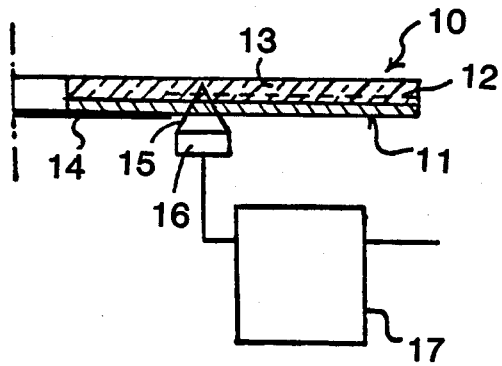
FIG. 1B is similar to FIG. 1A and illustrates the compact disc where it has been introduced upside-down.
Figure 3:
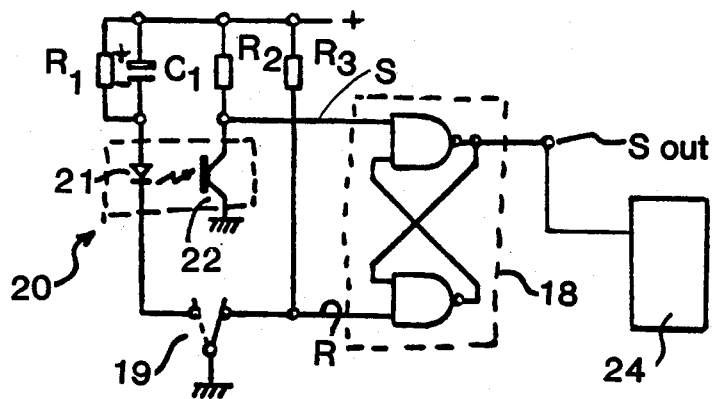

Referring to FIG. 3, as in the case of FIG. 1A under normal operating conditions before a disc is inserted, the R input is connected to ground ("zero") and the S input is connected to the "+" terminal through the resistance and receives a positive voltage level or "one" signal. When a disc is inserted, the switch 19 is actuated to the dashed line postion voltage (a "one"). The switch 19 also connects the LED 21 across the power supply through the RC circuit, which produces an immediate high current flow and light emission, which gradually dims during the time interval determined by the time constant of the RC circuit. If the operative face of the disc reflects light to the receiver diode 22, this element 22 is rendered conductive which connects the S input to ground and produces a "zero" on the S input. With a "one" on the R input and a "zero" on the S input, the flip-flop 18 will change state, producing a "one" on $S_{out}$ indicating the detection of the operative face of a disc. If the receiver diode 22 receives no light and is not rendered conductive, the $S_{out}$ terminal will remain at its original "zero" level.

The control signal at the terminal $S_{out}$ obtained when the disc is inverted is advantageously used to control, e.g, (a) an optical and/or auditory alarm; (b) the rejection of the disc in apparatus with automatic ejection; and (c) an interruption of the automatic or manual insertion movement of the disc by connecting the terminal $S_{out}$ to elements 24 of the turntable apparatus for operating an alarm, automatic ejection or interrupt device.

I claim:

1. A detector system for turntable apparatus for detecting the operative face of a record disc carrying data on one face only comprising, in combination:

means for reading data carried adjacent a face of a record disc and operative to produce a data or no-data signal on reading the face of a record disc in said turntable apparatus, circuit means including a delay circuit having a time constant defining a time interval, a switch actuable to start said time interval, and a memory circuit connected to the output of said reading means to receive said data or no-data signal during said time interval, said circuit means producing an output signal indicating the operative face of a record disc upon said memory circuit receiving a data signal within said time interval after said switch is actuated.

2. A detector system according to claim 1 wherein said turntable apparatus includes an alarm element connected to said circuit means to be operated responsive to said memory circuit receiving a no-data signal during said time interval representing a record disc with operative side inverted in the apparatus.

3. A detector system according to claim 1 wherein said turntable apparatus includes an element to reject an inverted record disc connected to said circuit means to be operated responsive to said memory circuit receiving a no-data signal during said time interval representing a record disc with operative side inverted in the apparatus.

4. A detector system according to claim 1 wherein said turntable apparatus includes an element to interrupt the introduction of a record disc into said turntable apparatus connected to said circuit means to be operated responsive to said memory circuit receiving a no-data signal during said time interval representing a record disc with operative side inverted in the apparatus.

5. A detector system according to claim 1 in which said reading means comprises a laser device and a control circuit for focusing said laser device and operative to produce a data or a no-data signal according to whether said laser device is focused on data adjacent the face of a record disc in said turntable apparatus.

6. A detector system according to claim 1 in which said reading means comprises an opto-electronic device operative to produce a data or a no-data signal according to whether said opto-electronic device detects data adjacent one operative face of a record disc.

7. A detector system according to claim 6 in which said opto-electronic device comprises a light emitting diode and a receiver diode for reading data reflected from the face of a record disc.

8. A detector system according to claim 1 in which said memory circuit comprises a flip-flop logic circuit connected to the reading means and operative to deliver an output signal according to the condition of the signal from said reading means.

9. A detector system according to claim 1 in which said memory circuit comprises a flip-flop circuit.

10. A detector system for turntable apparatus for detecting the operative face of a record disc carrying data on one face only comprising, in combination:

means for reading data carried adjacent a face of a record disc and operative to produce a data or a no-data signal on reading the face of a record disc in said turntable apparatus, a delay circuit having a time constant defining a time interval, a logic circuit connected to the output of said reading means to represent by its state the receipt of a data or a no-data signal during said time interval, and a circuit connected to operate elements of said turntable apparatus responsive to the state of said logic circuit representing a no-data signal indicating a record disc in the apparatus with operative side inverted.

* * * * *